United States Patent Office 3,499,862
Patented Mar. 10, 1970

3,499,862
METHOD OF PREPARING SHAPE RETAIN-
ING BODIES OF ORGANIC POLYMER
HYDROGELS
Otto Wichterle, Prague, Czechoslovakia, assignor to
Ceskoslovenska Akademie ved, Prague, Czechoslovakia
No Drawing. Filed May 23, 1966, Ser. No. 551,873
Claims priority, application Czechoslovakia,
May 24, 1965, 3,380/65
Int. Cl. C08f 47/12
U.S. Cl. 260—29.7                                8 Claims

ABSTRACT OF THE DISCLOSURE

When a hydrophilic monoolefin is copolymerized with 0.1 to 2.0% of a cross-linking agent in a solvent essentially consisting of an inert, non-aqueous liquid miscible with water, the resulting gel shrinks in contact with water when the solvent amounts to 40% to 80% of the copolymerization mixture. The hydrogel ultimately obtained has better optical and mechanical properties than are available with less solvent or water in the polymerization mixture. Defects caused by imperfections of a mold in which the polymerization is performed are reduced in size by the shrinkage.

---

This invention relates to hydrogels whose solid constituent is a sparingly cross-linked organic polymer, and particularly to a method of producing shaped bodies of such hydrogels.

As disclosed, for example, in my earlier U.S. Patent 2,976,576, shape-retaining bodies of polymer hydrogels may be prepared by copolymerizing hydrophilic organic monomers having an olefinic double bond with a small amount of a polymerizable cross-linking agent. If the copolymerization takes place in the presence of water, a hydrogel is directly obtained. When a solvent miscible with water is present in the mixture of monomers, there is obtained a gel whose solvent is replaced by water when the polymer body makes contact with an aqueous liquid.

The known shape-retaining hydrogel bodies so produced have been found to be useful as contact lenses, as semipermeable membranes, and for other purposes.

Suitable olefinically unsaturated monomers include ethylene glycol monomethacrylate, ethylene glycol acrylate, diethylene glycol methacrylate and acrylate, acrylamide and methacrylamide, and monovinyl and monoallyl esters of hydroxycarboxylic acids such as tartaric or malic acid.

Cross-linking agents capable of copolymerization with one or more of the above olefinic monomers in an obvious manner include the diacrylates and dimethacrylates of ethylene glycol or diethylene glycol, di- or triesters of tartaric acid with vinyl or allyl alcohol, the corresponding diester of malic acid, N,N'-methylene-bis-methacrylamide and N.N'-methylene-bis-acrylamide, sulfonated divinylbenzene, divinylsulfon, hexahydro-1,3,5-triacrylyltriazine, and the like. The amount of the polymerizable cross-linking agent should generally be between 0.1 and 2.0% of the olefinic monomer which constitutes the bulk of the monomer mixture.

A wide variety of inert liquid solvents does not interfere with the copolymerization reaction. If at least a portion of the solvent forms a homogeneous liquid phase with the monomers originally present, the solvent is dispersed in the copolymer ultimately formed to constitute a gel therewith. If the solvent is miscible with water, it may be replaced in the gel structure by water when the polymerizate is contacted with an aqueous liquid.

Ethylene glycol or glycerol do not react with the monomers nor with the cross-linking agents mentioned above, and do not interfere with polymerization. They are miscible with water, and are therefore typical of the non-aqueous solvents which may be employed in the method of the invention. Others will be mentioned as the disclosure proceeds, and those skilled in the art will readily select suitable solvents not specifically referred to herein as conditions may require.

They will also choose other olefinic monomers and cross-linking agents other than those specifically referred to which combine affinity to water with adequate stability. Generally, all water-soluble monoolefinic compounds are suitable as principal monomers in the process of the invention if they do not ionize or otherwise decompose in the presence of water, and any diolefinic compound which is soluble in the principal monomer and similarly resists decomposition by water may serve as a cross-linking agent.

The mono- and polyacrylates and -methacrylates of dihydric and polyhydric alcohols are the preferred principal monomers and cross-linking agents as far as they meet the above criteria. Suitable alcohol moieties in such esters other than those mentioned above include mannitol sorbitol, and other alcohols derived from sugars, pentaerythritol, polyvinyl alcohol, and the like.

Additional examples of suitable inert solvents miscible with water are formamide, dimethylformamide, dimethylsulfoxide, the glycol esters of lactic acid, and the liquid polyethyleneglycols.

It is characteristic of the copolymers of my earlier invention that the sparingly cross-linked polymers reach osmotic equilibrium with water or aqueous liquids at a water content of 40% or less. If the polymer originally contains less than 40% water or the corresponding amount of a non-aqueous solvent, it absorbs water from an ambient aqueous medium, and its volume increases by swelling. This fact was utilized heretofore in separating a hydrogel from a mold in which it had been formed by polymerization. If the polymerization mixture originally contained less than 40% water or a corresponding amount of solvents replaceable by water, the gel formed during polymerization could simply be removed from the mold by immersing the mold with its contents in water. The molded hydrogel spontaneously separated from the mold when it swelled without damage to its surfaces, a valuable feature in the manufacture of hydrogel contact lenses.

The swelling ability of a copolymer of the type described, regardless of the chemical nature of its constituents, decreases as the original solvent content approaches a water equivalent of approximately 40%, and it was therefore considered necessary heretofore to hold the solvent content of the polymerization mixture well below this limit if polymerization took place in a mold, and the polymer body was to be removed from the mold with a minimum of inconvenience.

I now have found that separation of a polymer from a mold in which it was formed is also readily accomplished if the solvent content of the polymerization mixture substantially exceeds the critical 40% water equivalent value, and that this property also is practically independent of the nature of the principal monomer, of the cross-linking agent, and of the solvent.

When a gel prepared from a mixture containing more than 40% water miscible solvent is placed in contact with water or an aqueous liquid, the gel shrinks by outward diffusion of the non-aqueous solvent at a rate smaller than the inward diffusion of water from the ambient aqueous medium. The shrinkage is predictable, and is directly related to the excess solvent present over the 40% water equivalent.

Preparing a gel by copolymerization of a mixture of a mono-olefinic monomer with a small amount of a cross-linking agent in a mold in the presence of an amount of solvents miscible with water and exceeding 40% has important advantages over the previously employed method.

The molded object reproduces the shape of the mold more accurately though on a different scale when it shrinks from a configuration corresponding to that of the mold than when it expands from the conforming configuration. Inaccuracies present in the mold are reduced rather than enlarged. This is particularly important in the molding of contact lenses where highest accuracy is desirable, and where the manufacturing tolerance for the mold in units of length is a significant factor in the quality of the lens. The tolerance is enlarged when the molded lens is subsequently swelled, and reduced, when the lens is shrunk after molding. The size of the mold for producing a lens of given dimensions is greater with the instant method than with that used heretofore. The lens mold therefore is more easily ground and polished to the necessary finish and accuracy.

The shrinkage of the molded gel is uniform in all dimensions. The hydrogel ultimately obtained by contact with water or an aqueous liquid such as isotonic saline solution is an exact replica of the mold cavity in which it was produced, though on a smaller scale. The dioptric power of the lens is not affected by the shrinkage, but overall mechanical and optical properties are improved in a manner diametrically opposite to what would normally be expected. The properties of synthetic fibers, for example, normally deteriorate if the constituent polymer is prepared with an excess of solvent.

It is believed that the improved properties of lenses and similar devices prepared from sparingly cross-linked hydrogel blanks containing an excess of solvent by shrinkage in contact with an aqueous medium are due to relaxation of internal stresses which develop during polymerization, and which tend to be increased by swelling after release from the mold. The shrinkage occurring when cured polymerization mixtures of this invention are contacted with an aqueous medium also is believed to enhance coiling of the polymer chains, and that this accounts at least in part for the improved toughness, resilience, and tear resistance of the hydrogen bodies produced thereby.

Optical anisotropy is occasionally observed when molded hydrogel blanks of the type described and containing less than 40% water or its equivalent are swelled by contact with an aqueous medium after polymerization. Such anisotropy may become visible as a haze or slight opacity, and occurs more frequently when ethylene glycol monomethacrylate alone is used as the principal monomer than with a mixture of this monomer with monomethacrylates of diethylene glycol or a polyethyleneglycol. Yet, it is economically more advantageous to use as few ingredients in a polymerization mixture as is possible, and ethylene glycol methacrylate is a particularly convenient monomer because of its low cost and chemical stability, and because it is easily prepared and readily purified by vacuum distillation at low temperature. Lenses prepared from polymerization mixtures in which ethylene glycol monomethacrylate is the sole monoolefinic monomer and which contain more than 40% water miscible solvent never show haze nor other symptoms of optical anisotropy.

The ultimate size of the lens after shrinking in water is independent of the nature of a water-miscible, inert, non-aqueous solvent originally present in the polymerization mixture and the resulting gel, but is only a function of the initial volume of the non-aqueous solvent. Although a copolymer of ethylene glycol methacrylate with a small amount of cross-linking agent prepared without solvent will swell to 700% of its volume when in equilibrium with dimethylformamide, to 450% with ethylene glycol, and to only 101% with glycerine, polymer gels of the same monomers and cross-linking agent containing equal volumes of these three solvents, greater than 40% of the total polymerization mixture, shrink to the same size when in contact with water.

The amount of inert liquid solvent added to the polymerization mixture has little or no effect on the composition of the product obtained after shrinking in contact with water, as long as the solvent is originally present in an amount substantially greater than 40% of the polymerization mixture and smaller than about 80%. The shrinkage which occurs when a non-aqueous water-miscible solvent is replaced in a polymer gel of the invention by the water of an ambient aqueous medium is predictable because it is a unique function of the percentage of solvent in the polymerization mixture. For small amounts of shrinkage, this relationship is adequately expressed by the equation $$b = a \sqrt[3]{1 - \frac{p}{100}}$$

wherein $b$ is the linear shrinkage of the molded gel from the internal dimensions of the mold, $a$ is the linear contraction occuring during polymerization of the monomer mixture when free from solvent, and $p$ is the percentage of inert water-miscible solvent in the polymerization mixture, $a$ and $b$ being expressed in the same units of length. The polymerization is preferably performed in the presence of catalysts or initiators known in themselves. Various compounds or redox systems developing free radicals under the conditions of polymerization may be employed as is conventional, and ionic catalysts are useful in anhydrous polymerization mixtures, such as those containing dimethyl sulfoxide as a solvent, if the monomers employed respond to ionic catalysts. Peroxides, hydroperoxides, peracetals, and azo-compounds that are at least partly soluble in the polymerization mixture have been used successfully in the method of the invention. Means other than chemical may provide the energy for initiating polymerization, and it is conventional to use electromagnetic radiation of short wave length or ionizing radiation, such as ultraviolet or gamma rays.

The catalysts heretofore employed with the monomers of the invention are suitable for the process of the invention, and the catalysts or initiators are not in themselves relevant to this invention.

The following examples further illustrate the invention, but it will be understood that the invention is not limited to the examples since it is based on a principle common to a broad class of known mono-olefinic monomers, the many known cross-linking agents useful for forming three-dimensional molecule structures therewith, and all compatible solvents which are inert to the reactants and water-miscible liquids.

EXAMPLE 1

A polymerization mixture was prepared from 15 parts (by weight) of a monomer mixture consisting of 99.7% ethylene glycol monomethacrylate and 0.3% ethylene glycol bismethacrylate as a cross-linking agent, 85 parts glycerol, and 0.1% diethyl percarbonate as a catalyst. The mixture was poured into a mold assembled from two polished glass plates separated in parallel alignment by a thin silicon rubber tube which served as a seal. A frame including springs applied to the free faces of the glass plates held the mold assembled.

The polymerization mixture was introduced into the mold cavity between the glass plates, and was held there 20 minutes at 65° C. whereupon polymerization was completed, and a transparent foil free of bubbles was peeled from the glass plates. It was washed in water until the glycerol was removed and stable dimensions at 63.7% of the original dimensions, as molded, were reached. The volume of the foil when in equilibrium with the ambient water was 39% of the volume after molding. The foil had high strength for a material of this type, and excellent optical properties.

When the same monomer mixture was combined with glycerol at a ratio of 80 parts monomers to 20 parts glycerol, the foil prepared in the manner indicated above swelled to 109.4% of its molded linear dimensions and by 31% of its molded volume when the glycerol was replaced in the gel structure by water diffused inward from an immersion bath. The mechanical strength of the swollen foil was lower by a small, but significant amount than that of the foil produced with 85 parts of glycerol, and its optical properties were similarly inferior.

EXAMPLE 2

50 ml. of a mixture of 98.7% ethylene glycol monomethacrylate, 0.3% diethyleneglycol - bis - methacrylate, and 1% ethylene glycol were mixed with 50 ml. formamide and an amount of azo-bis-isobutyronitrile corresponding to 0.2% of the combined monomers. The polymerization was performed in the mold described in Example 1 at 75° C. in 50 minutes. The polymer foil was immersed in flowing water until it reached equilibrium at 91% of its original linear dimensions. The membrane obtained was fully transparent and of relatively high mechanical strength.

When the concentration of formamide in the polymerization mixture was increased to 60% by volume, a similar blank was obtained by polymerization, and shrank to 81.3% of its linear dimensions when contacted with water. Practically identical hydrogel membranes were produced when the formamide was replaced by an equal volume of dimethylformamide or ethylene glycol.

EXAMPLE 3

An upwardly open glass mold having a hemispherical cavity of 19.3 mm. diameter was charged with 0.21 g. of a mixture consisting of 30% (by weight) ethylene glycol methacrylate, 0.1% ethylene glycol-bis-methacrylate, 69.7% ethylene glycol, and 0.2% diisopropyl percarbonate. The mold was rotated about the vertical radius of its cavity at 346 r.p.m. in an argon atmosphere while its contents were kept at about 60° C. by means of an infrared radiation heater. The polymerization mixture was gelled after 25 minutes, whereupon rotation was stopped, but heating was continued for 20 minutes.

The mold and its contents were then immersed in frequently changed warm water until all ethylene glycol had been washed from the gel, whereby the polymer body spontaneously separated from the mold. It had the shape of a contact lens of 12.4 mm. diameter whose circular edge was thin and pliable, yet sharply defined and of perfect configuration. The optical power of the lens was —7D, its external radius of curvature 7.25 mm., and the internal radius of curvature of the central portion of the lens was 6.5 mm.

Analogous results were obtained when ethylene glycol methacrylate was replaced as the principal olefinic monomer by the aforementioned esters having other acid or alcohol moieties, more specifically the monoesters of acrylic acid with polyhydric alcohols such as glycol, the amides of acrylic and methacrylic acid, and the monovinyl and monoallyl esters of hydroxycarboxylic acids having saturated carbon chains.

Diesters of acrylic and methacrylic acid with the aforementioned polyhydric alcohols are the preferred cross-linking agents if the polymer hydrogel ultimately produced is intended as a lens, but other cross-linking agents soluble in the principal monomer and partly enumerated above may be freely chosen if highest optical qualities of the hydrogel are not required, as in membranes for dialyzers and the like.

While the invention has been described with particular reference to specific embodiments, it will be understood that it is not limited to the examples of the invention chosen for the purpose of the disclosure, but is to be construed broadly and limited solely by the scope of the appended claims.

I claim:
1. A method of preparing a shape-retaining body essentially consisting of a hydrogel of a sparingly cross-linked organic polymer, which comprises:
   (a) mixing a hydrophilic monomer having an olefinic double bond with 0.1 to 2.0 percent of a cross-linking agent capable of forming a three-dimensional cross-linked copolymer with said monomer, with a polymerization catalyst, and with an amount of an inert, non-aqueous, liquid solvent miscible with water,
      (1) said amount being at least 40 percent, but not more than 80 percent of the volume of the resulting mixture, said mixture essentially consisting of said monomer, said cross-linking agent, said catalyst, and said solvent,
      (2) said monomer, said cross-linking agent, and at least a portion of said solvent being miscible to form a single liquid phase;
   (b) holding said mixture under polymerization conditions until a gel of said solvent in the resulting copolymer is formed; and
   (c) contacting said gel with an aqueous liquid until said gel reaches osmotic equilibrium with said aqueous liquid,
      (1) the amount of said solvent being sufficient to cause shrinking of said gel upon said contacting thereof with said aqueous liquid.
2. A method as set forth in claim 1, wherein said monomer is a member of the group consisting of water-soluble esters of acrylic and methacrylic acid with polyhydric alcohols, acrylamide, and methacrylamide.
3. A method as set forth in claim 1, wherein said monomer is ethylene glycol methacrylate.
4. A method as set forth in claim 3, wherein said solvent is a polyhydric alcohol.
5. A method as set forth in claim 4, wherein said aqueous liquid is water.
6. A method as set forth in claim 4, wherein said cross-linking agent is an ester of a polyhydric alcohol with acrylic or methacrylic acid having two olefinic double bonds.
7. A method as set forth in claim 1, wherein said monomer and said cross-linking agent are copolymerized in the presence of said solvent in a confining mold until said gel is formed, and wherein said mold and the gel confined therein are immersed in said aqueous liquid until said gel spontaneously separates from said mold.
8. A method as set forth in claim 1, wherein said monomer is selected from the group consisting of ethyleneglycol methacrylate, ethyleneglycol acrylate, diethyleneglycol methacrylate, diethyleneglycol acrylate, acrylamide and methacrylamide, and said gel being contacted with said aqueous liquid until said solvent is substantially completely replaced by water.

References Cited

UNITED STATES PATENTS 2,730,768    1/1956    Clarke.
2,976,576    3/1961    Wichterle et al. _____ 260—89.5
3,220,960    11/1965    Wichterle et al.

MURRAY TILLMAN, Primary Examiner

W. J. BRIGGS, SR., Assistant Examiner

U.S. Cl. X.R.

260—30.8, 32.6, 33.4; 264—1, 342; 351—160, 177